US009561756B2

United States Patent
Polovich

(10) Patent No.: US 9,561,756 B2
(45) Date of Patent: Feb. 7, 2017

(54) TRIM MEMBER ATTACHMENT STRUCTURE

(71) Applicant: Nissan North America, Inc., Franklin, TN (US)

(72) Inventor: Dan Polovich, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/593,756

(22) Filed: Jan. 9, 2015

(65) Prior Publication Data

US 2016/0200265 A1    Jul. 14, 2016

(51) Int. Cl.
*B60R 13/02* (2006.01)
*B60R 13/04* (2006.01)
*F16B 5/06* (2006.01)

(52) U.S. Cl.
CPC .......... *B60R 13/0206* (2013.01); *B60R 13/04* (2013.01); *F16B 5/065* (2013.01); *F16B 5/0657* (2013.01); *F16B 5/0664* (2013.01)

(58) Field of Classification Search
CPC ...... B60R 13/0206; B60R 13/04; F16B 5/065; F16B 5/0657; F16B 5/0664
See application file for complete search history.

(56) References Cited

U.S. PATENT DOCUMENTS

| | | | |
|---|---|---|---|
| 4,517,710 A | 5/1985 | Beckmann | |
| 8,615,962 B1 * | 12/2013 | Perez | B60R 13/0206 24/292 |
| 2008/0007080 A1 | 1/2008 | Maki et al. | |
| 2009/0261613 A1 | 10/2009 | Johnson et al. | |

* cited by examiner

*Primary Examiner* — Glenn Dayoan
*Assistant Examiner* — Melissa A Black
(74) *Attorney, Agent, or Firm* — Global IP Counselors, LLP

(57) ABSTRACT

A trim member attachment structure for a vehicle includes a trim member, a base portion extending from the trim member and an end portion extending from the base portion. An engagement surface extends from a first side of the base portion and faces the trim member. A shoulder extends from the base portion on a second side of the base portion. A first end of the shoulder and a first end of the engagement surface are positioned at substantially equal distances along a length of the base portion.

20 Claims, 10 Drawing Sheets

TRIM MEMBER ATTACHMENT STRUCTURE

BACKGROUND

Field of the Invention

The present invention generally relates to a vehicle trim member attachment structure. More specifically, the present invention relates to vehicle trim member attachment structure configured to substantially prevent movement of the installed trim member.

Background Information

Vehicles are designed to include trim members that are attached to related vehicle structures. The trim members include attachment structures that provide a simple way to install the trim members without requiring expensive tooling.

SUMMARY

It has been discovered that a trim member can move after installation. Such movement of the trim member can cause fit and finish concerns, as well as disengagement of the trim member from the vehicle structure to which the trim member is attached. Therefore, it is desirable to provide a trim member attachment structure that substantially prevents movement of the installed trim member.

In view of the state of the known technology, one aspect of the present invention provides a trim member attachment structure for a vehicle. A base portion extends from a trim member, and an end portion extends from the base portion. An engagement surface extends from a first side of the base portion and faces the trim member. A shoulder extends from the base portion on a second side of the base portion. A first end of the shoulder and a first end of the engagement surface are positioned at substantially equal distances along a length of the base portion.

Another aspect of the present invention provides a trim member attachment structure for a vehicle. A base portion extends from a trim member; an end portion extends from the base portion. The end portion includes an engagement surface, a shoulder and a guide surface. The engagement surface extends from a first side of the base portion and faces the trim member. The shoulder extends from the base portion on a second side of the base portion. The shoulder includes a ramped surface extending from the base portion, and an end surface extending from the ramped surface. The guide surface extends between a distal end of the end portion and the engagement surface. An alignment surface extends from the base portion in a direction different from the engagement surface and the shoulder.

BRIEF DESCRIPTION OF THE DRAWINGS

Referring now to the attached drawings that form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
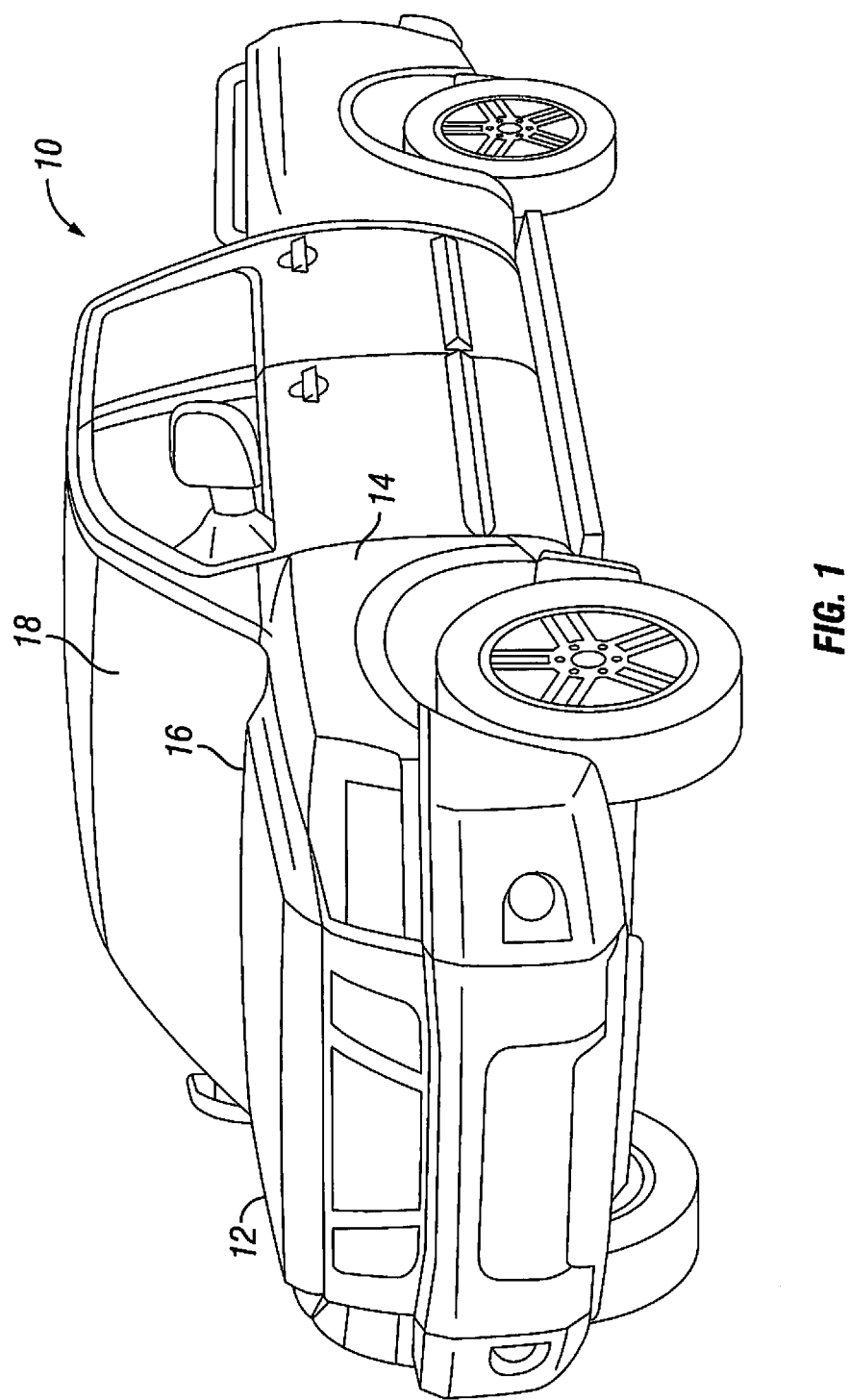
FIG. 1 is a perspective view of an exemplary vehicle.
Figure 2:
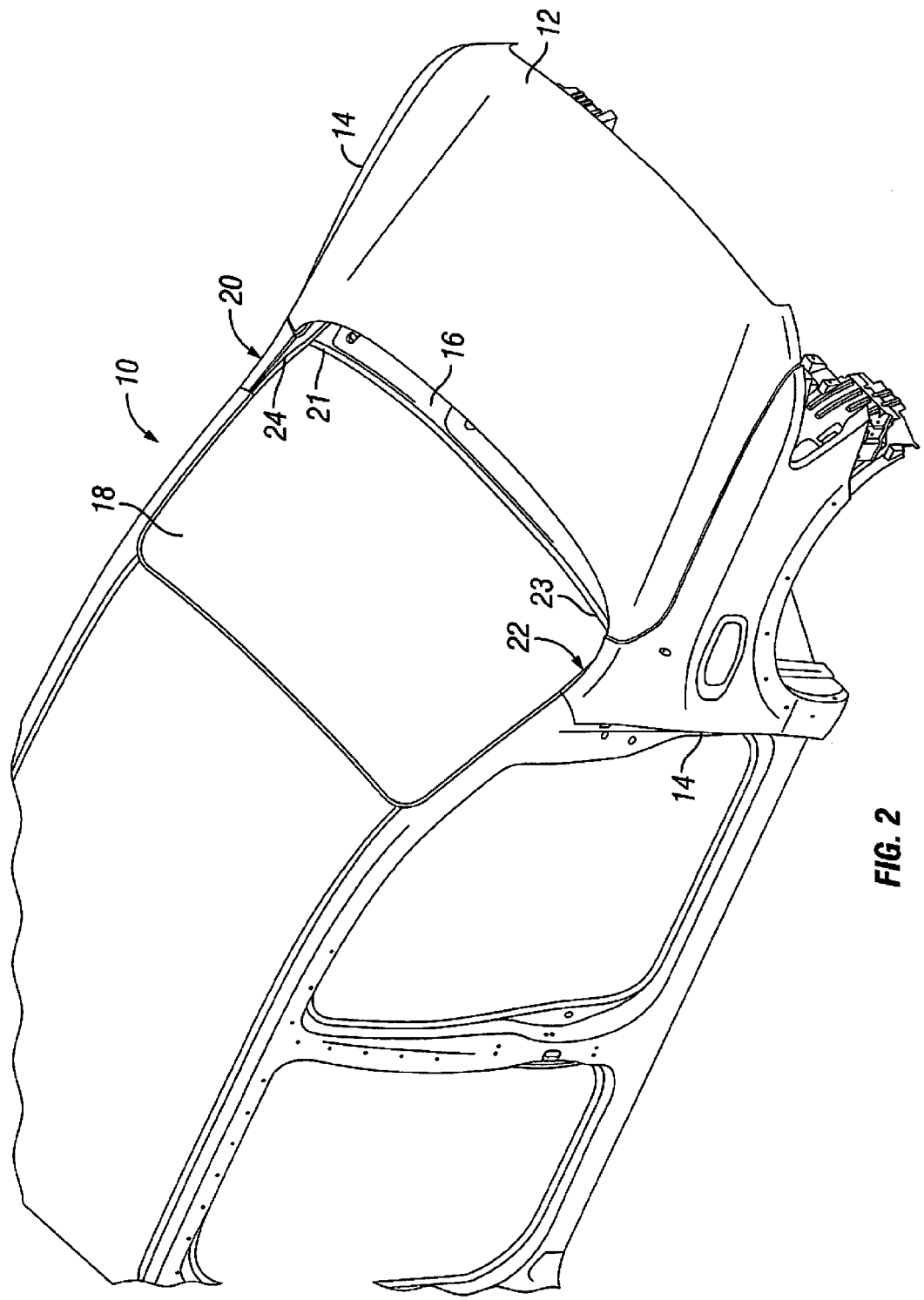
FIG. 2 is a partial perspective view of the vehicle of FIG. 1 including the trim member in accordance with a first exemplary embodiment of the present invention.

Referring initially to FIGS. 1-10, a trim member attachment structure is illustrated in accordance with a first exemplary embodiment. As shown in FIGS. 1 and 2, the trim member attachment structure is connected to a fender bracket of a pick-up truck vehicle. However, the trim member attachment structure can be used to connect the trim member to any suitable structure in any suitable vehicle.

The vehicle 10, as shown in FIGS. 1 and 2, includes plurality of elements, such as a hood 12, front fenders 14, a cowl cover 16 and a windshield 18. A first trim member 20 is connected to a fender bracket 91 (FIG. 6) at a first end 21 of the cowl cover 16 on a right side of the hood 12 as shown in FIG. 2. A second trim member 22 is connected to a fender bracket at a second end 23 of the cowl cover 16 and on a left side of the hood 12. The second trim member 22 is substantially similar to the first trim member 20, except for being a mirror image thereof. The following description refers to the first trim member 20 and is equally applicable to the second trim member 22.

Figure 6:
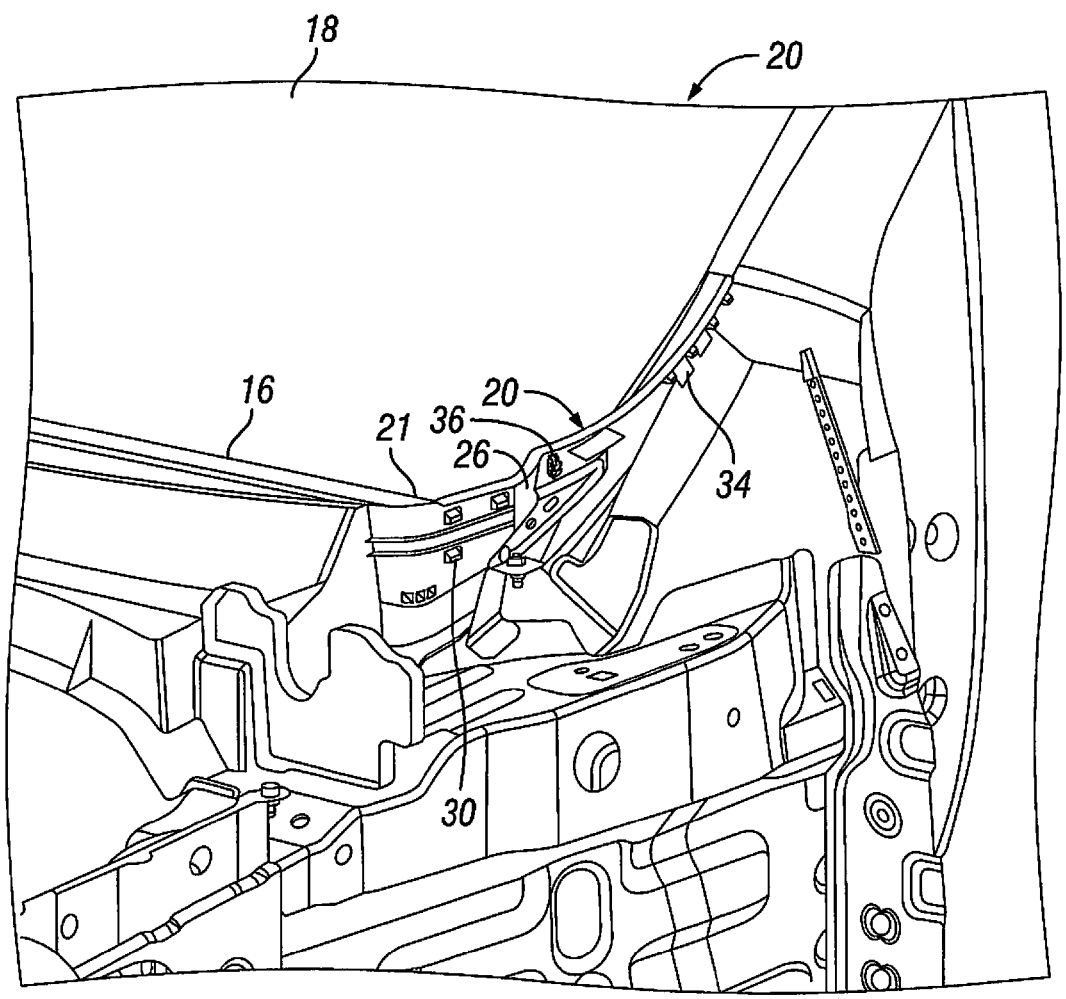
FIG. 6 is a partial perspective view of the installed trim member.
Figure 7:
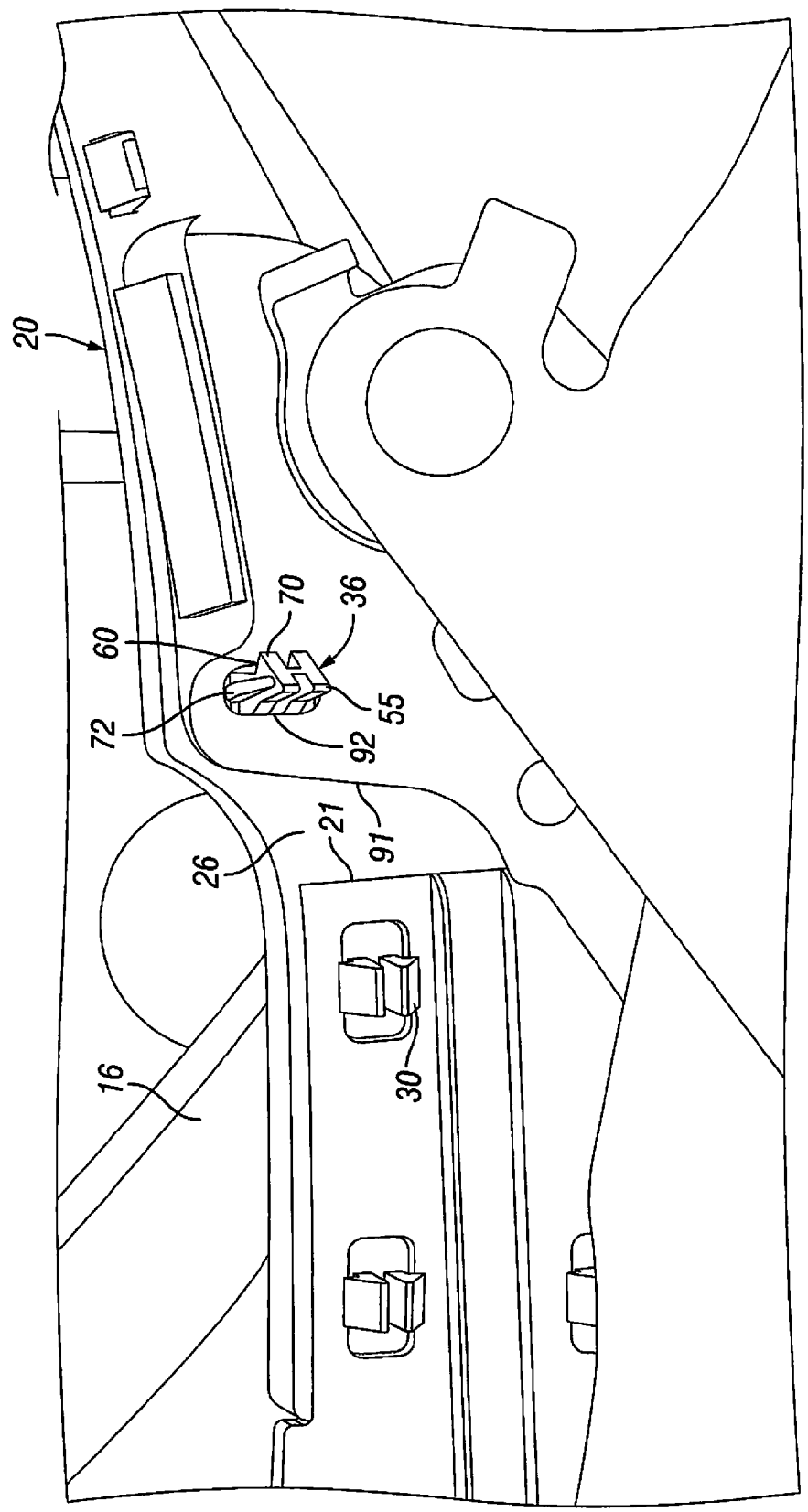
FIG. 7 is an enlarged perspective view of the installed trim member of FIG. 6.

As shown in FIGS. 2-5, the trim member 20 has an outer surface 24 and an inner surface 26. The outer surface 24 is exposed externally of the vehicle 10, as shown in FIG. 2. The inner surface 26 is not exposed externally of the vehicle 10 and faces related structure to which the trim member 20 is connected, as shown in FIGS. 6 and 7. A plurality of connecting members are disposed on the inner surface 26 of the trim member 20 to facilitate connecting the trim member. For example, a plurality of connecting members 30 disposed proximal a first end 32 of the trim member 20 are received by the cowl cover 16, as shown in FIG. 7. Other connecting members, such as interference arms 34 and edge biter clips 35, facilitate connecting the trim member 20 to other structural components of the vehicle 10. The interference arms 34 push against a body side outer to facilitate engaging the edge biter clips 35 with a fender flange.

Figure 3:
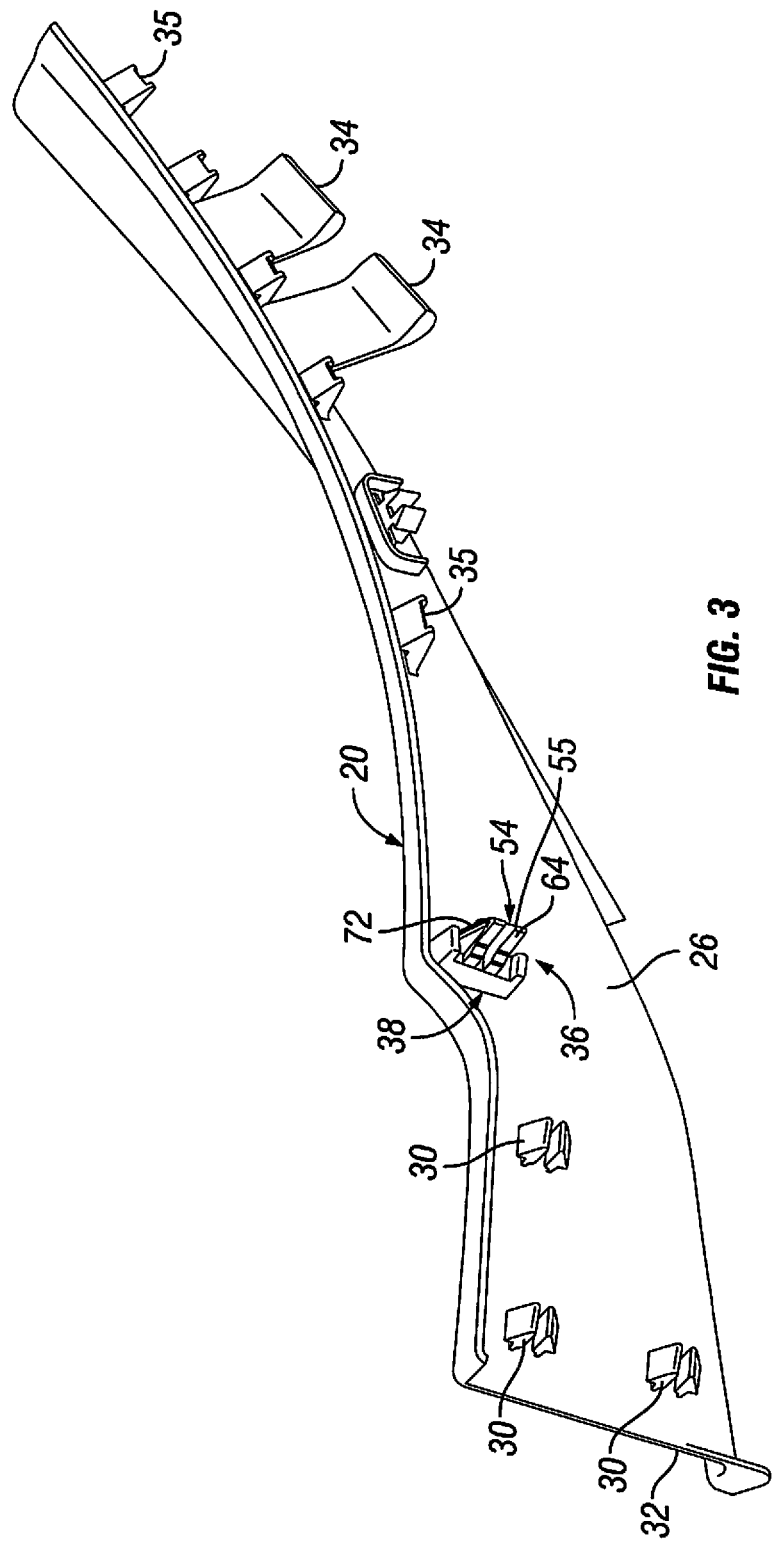
FIG. 3 is a front perspective view of the trim member of FIG. 2 showing the attachment structure.
Figure 4:
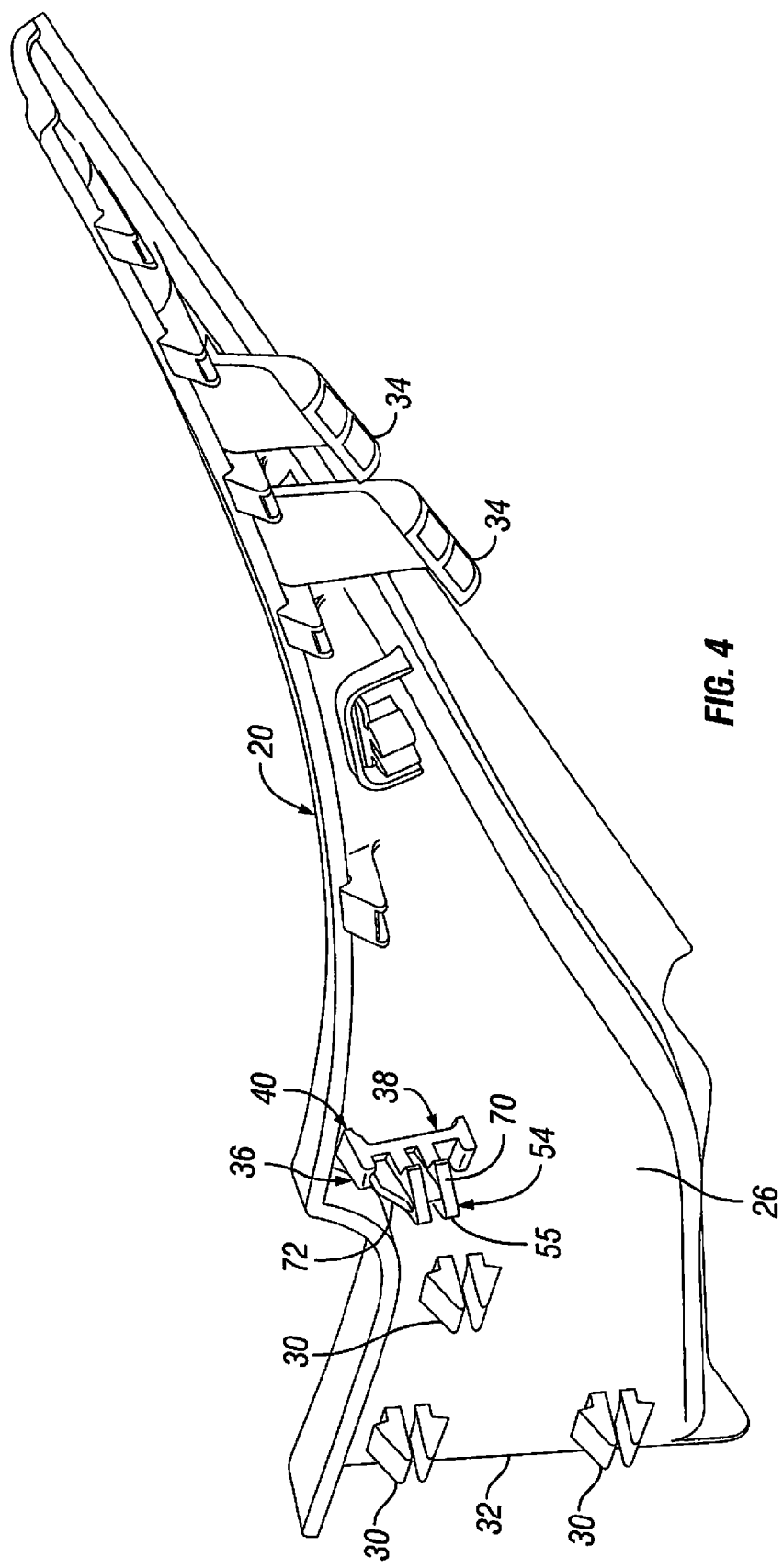
FIG. 4 is a rear perspective view of the trim member of FIG. 2.
Figure 5:
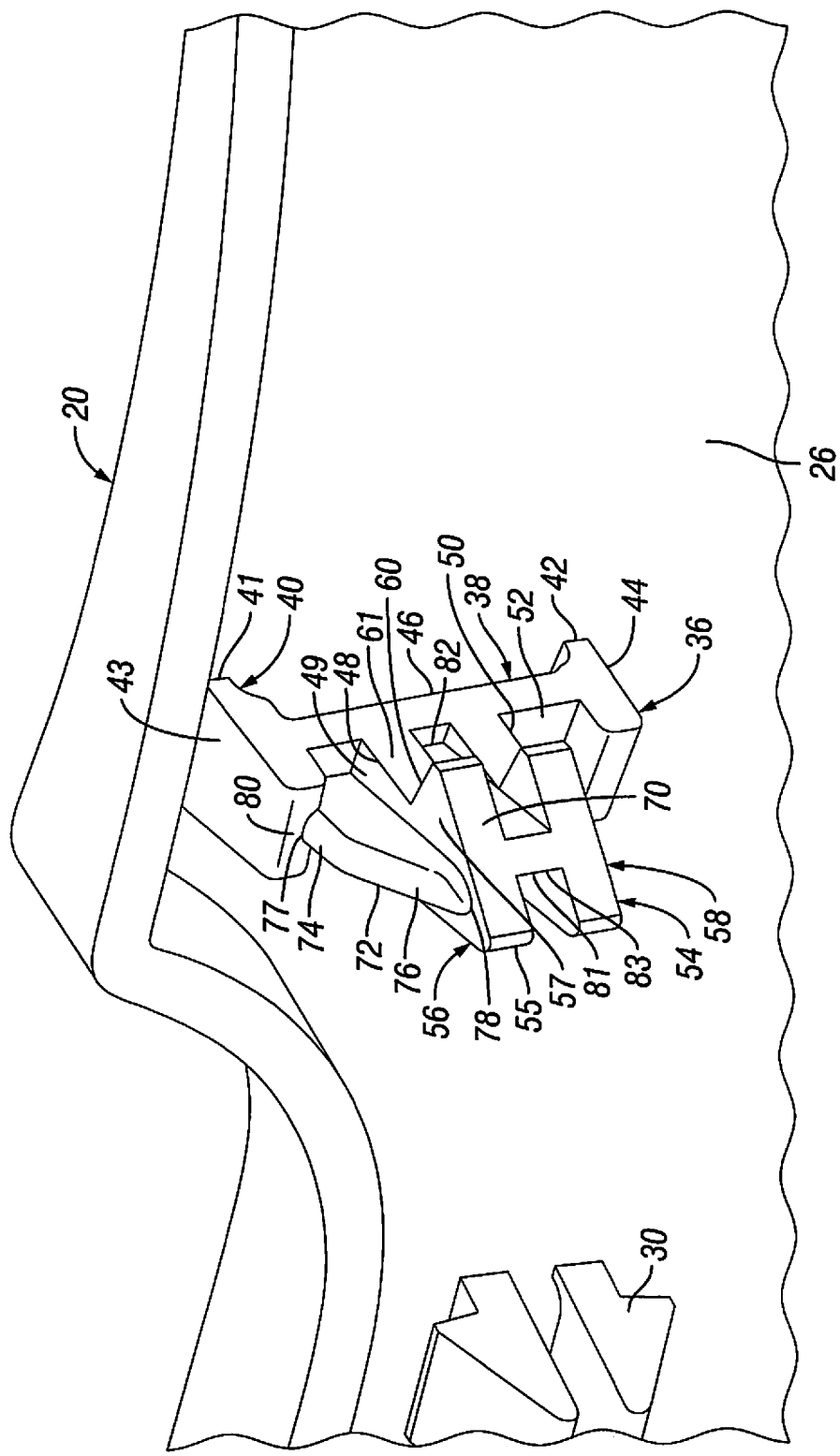
FIG. 5 is an enlarged rear perspective view of the trim member attachment structure of FIG. 4.

An attachment structure 36 is connected to the inner surface 26 of the trim member 20, as shown in FIGS. 3-5. A base portion 38 extends from the inner surface 26 of the trim member 20. A connector portion 40 connects the base portion 38 to the inner surface 26 of the trim member 20.

Figure 10:
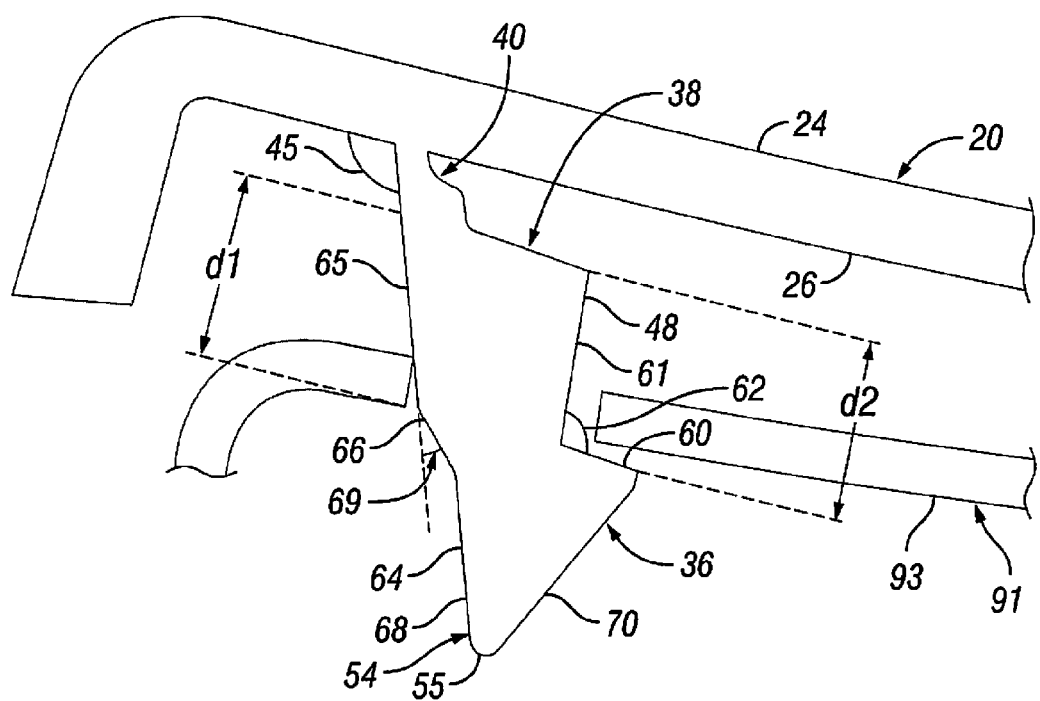
FIG. 10 is a top plan view in cross section of the trim member taken along line 10-10 of FIG. 8.

The connector portion 40 preferably includes a first connecting arm 41 connecting a first end 43 of the base portion 38 to the trim member 20 and a second connecting arm 42 connecting a second end 44 of the base portion 38 to the trim member 20. As shown in FIG. 10, an angle 45 is formed between the inner surface 26 of the trim member 20 and the connector portion 40. The angle 45 is preferably an obtuse angle, and more preferably is approximately 109 degrees. The connector portion 40 is preferably thinner in cross section than the base portion 38, as shown in FIG. 10. The thinner cross section of the connector portion 40 substantially prevents sink holes in the outer surface of the trim member 20 when molding the part, in addition to facilitating flexing of the attachment structure 36 during installation.

A cross member 46 of the base portion 38 extends from the first end 43 to the second end 44, as shown in FIG. 5. The cross member 46 is preferably spaced from the inner surface 26 of the trim member 20. First and second base portion arms 48 and 50 extend from an upper surface 52 of the cross member 46 in a direction away from the trim member 20. The first and second base portion arms 48 and 50 of the base portion 38 are spaced from each other on the cross member 46.

An end portion 54 extends from the base portion 38 to a distal end 55, as shown in FIG. 5. The distal end 55 of the end portion 54 is preferably rounded. The end portion 54 includes a first end member 56 extending from the first base portion arm 48 and a second end member 58 extending from the second base portion arm 50. The second end member 58 is substantially similar to the first end member 56. The distal end 55 of the end portion 54 is preferably thinner in cross section than the base portion 38, as shown in FIG. 10.

The first end member 56 of the end portion 54 includes an engagement surface 60 extending from a first side 61 of the first base portion arm 48 of the base portion 38, as shown in FIG. 5. The engagement surface 60 faces the inner surface 26 of the trim member 20, as shown in FIGS. 5 and 10. An angle 62 is formed between the engagement surface 60 and the first side 61 of the first base portion arm 48 of the base portion 38, as shown in FIG. 10. The angle 62 is preferably obtuse, and more preferably is approximately 100 degrees.

A shoulder 64 of the end portion 54 extends from a second side 65 of the first base portion arm 48 of the base portion 38, as shown in FIG. 10. The second side 65 of the first base portion arm 48 is preferably disposed opposite the first side 61. The shoulder 64 extends in a direction away from the engagement surface 60. The shoulder 64 includes a ramped surface 66 and an end surface 68. An angle 69 is formed between the ramped surface 66 and the end surface 68. The angle 69 is preferably acute, and more preferably is approximately 25 degrees. The end surface 68 is preferably substantially parallel to the second side 65 of the first base portion arm 48 of the base portion 38.

A distance d1 to a first end of the ramped surface 66 from a lower surface of the base portion 38 is preferably substantially equal to a distance d2 from the lower surface of the base portion 38 to the engagement surface 60, as shown in FIG. 10.

A guide surface 70 extends between the engagement surface 60 and the distal end 55 of the end portion 54, as shown in FIGS. 5 and 10. The guide surface 70 faces in a different direction than the shoulder 64.

Figure 9:
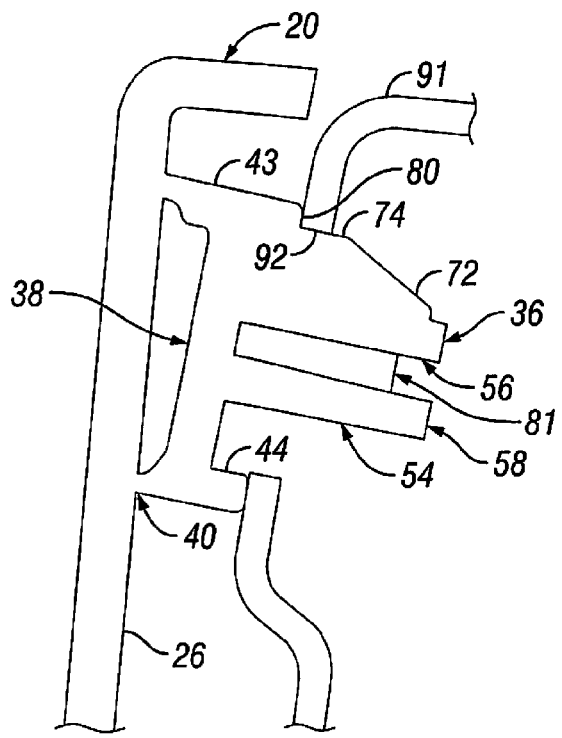
FIG. 9 is a front elevational view in cross section of the trim member taken along line 9-9 of FIG. 8.

An alignment member 72 extends from the base portion 38 in a direction different from the engagement surface 60, as shown in FIGS. 4 and 5. The alignment member 72 has a first surface 74 substantially parallel to a side surface 49 of the first base portion arm 48 of the base portion 38. The alignment member 72 extends in a direction away from the side surface 49, and the engagement surface 60 extends in a direction away from the first side 61. A second surface 76 of the alignment member 72 slopes from the first surface 74 to a side surface 57 of the end portion 54. The first and second surfaces 74 and 76 of the alignment member 72 face different directions than the engagement surface 60. The alignment member 72 has a first end 77 connected to the base portion 38 and a second end 78 connected to the end portion 54. A step 80 is formed between the alignment member 72 and the base portion 38, as shown in FIG. 9. The step 80 is preferably formed by the first surface 74 of the alignment member 72 and the first end 43 of the base portion 38.

Figure 8:
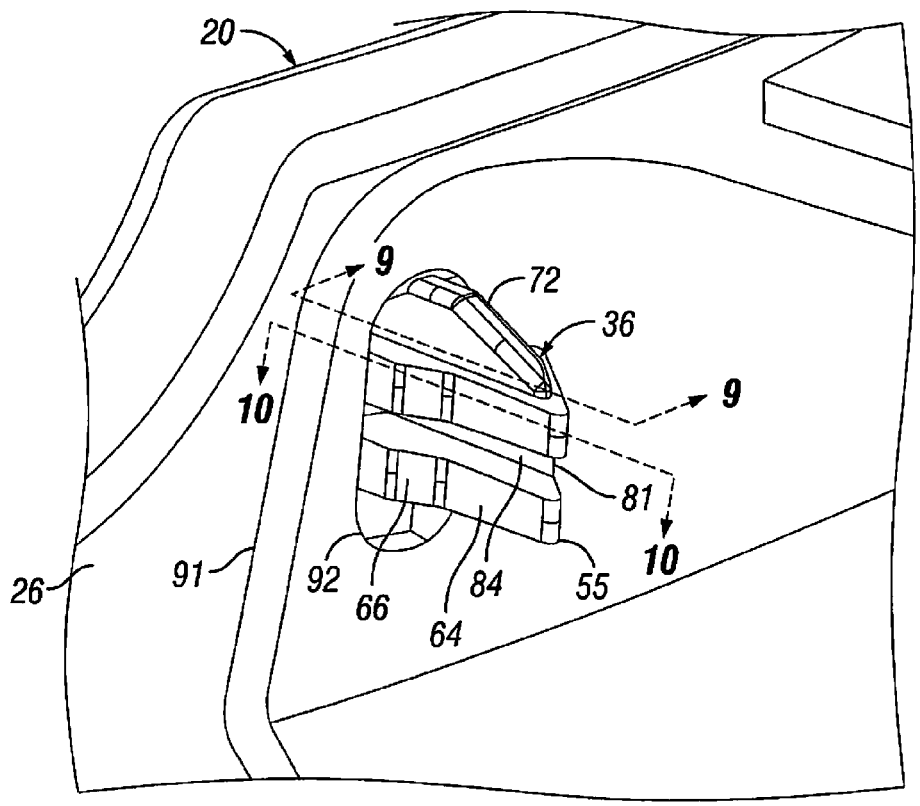
FIG. 8 is a front perspective view of the trim member connected to a fender bracket.

A support member 81 extends between the first and second arms 48 and 50 of the base portion 38 and the first and second end members 56 and 58 of the end portion 54, as shown in FIG. 5. The support member 81 has a first end 82 connected to the upper surface 52 of the cross member 46. A second end 83 of the support member 81 is preferably substantially planar with the guide surface 70 of the end portion 54. As shown in FIGS. 7 and 8, a first surface 84 of the support member 81 is spaced from the second side 65 of the base portion 38 and the end surfaces 68 of the end portion 54.

The attachment structure 36 is preferably unitarily formed as a single member. The attachment structure 36 is preferably unitarily formed as a single member with the trim member 20. The attachment member is preferably made of a thermoplastic elastomer, and more preferably is made of a thermoplastic vulcanizate.

Installation of the trim member 20 is shown in FIGS. 6-10. The attachment structure 36 of the trim member is received by an opening 92 in the fender bracket 91. Alternatively, the attachment structure 36 can be received by an opening in any suitable structure, such as a fender flange. The ramped surface 66 of the end portion 54 facilitates insertion of the attachment structure 36 due to the limited available space to manipulate the trim member 20.

The step 80 formed between the alignment member 72 and the connector portion 38 engages the opening 92 in the fender bracket 91, as shown in FIG. 9, thereby substantially preventing upward movement (as viewed in FIG. 9) of the trim member 20.

The angle 45 between the base portion 38 and the inner surface 26 of the trim panel 20 facilitates controlling the forward and aft movement of the installed trim member (the left and right direction as shown in FIG. 10). The angle 62 between the engagement surface 60 and the base portion 38 facilitates insertion of the end portion 54 through the fender bracket opening 92. The engagement surface 60 engages an inner surface 93 of the fender bracket to prevent withdrawal of the trim member 20 from the fender bracket 91. Engagement of the first and second sides 61 and 65 with the fender bracket 91 substantially prevents forward and aft movement of the installed trim member.

Second Exemplary Embodiment

Figure 11:
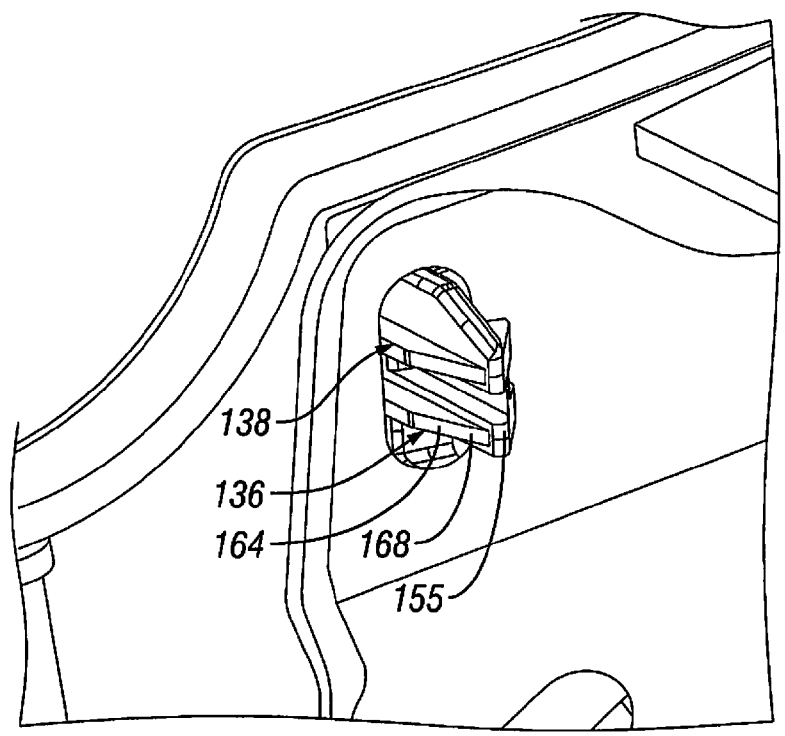
FIG. 11 is a front perspective view of a trim member connected to a fender bracket in accordance with a second exemplary embodiment of the present invention.

Referring now to FIG. 11, a second exemplary embodiment of the trim member attachment structure 136 is shown. The attachment structure 136 in accordance with the second exemplary embodiment is substantially similar to the attachment structure 36 of the first exemplary embodiment except for the noted differences. In view of the similarity between the first and second exemplary embodiments, the parts of the second exemplary embodiment that are substantially identical to the parts of the first exemplary embodiment will be given the same reference numerals as the parts of the first exemplary embodiment except in the 100 series, e.g. "1xx." Moreover, the descriptions of the parts of the second exemplary embodiment that are identical to the parts of the first exemplary embodiment may be omitted for the sake of brevity.

As shown in FIG. 11, a surface 168 of the shoulder 164 extends from the base portion 138 to the distal end 155. An angle is formed between the base portion 138 and the shoulder surface 168. The shoulder surface 168 is a substantially continuous and planar surface.

Third Exemplary Embodiment

Figure 12:
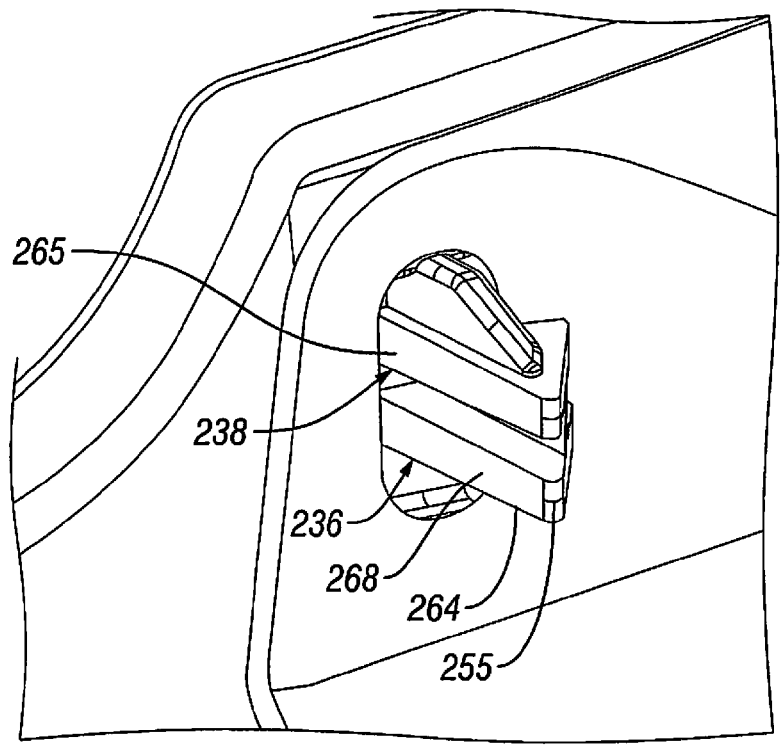
FIG. 12 is a front perspective view of a trim member connected to a fender bracket in accordance with a third exemplary embodiment of the present invention.

Referring now to FIG. 12, a third exemplary embodiment of the trim member attachment structure 236 is shown. The attachment structure 236 in accordance with the third exemplary embodiment is substantially similar to the attachment structure 36 of the first exemplary embodiment except for the noted differences. In view of the similarity between the first and third exemplary embodiments, the parts of the third exemplary embodiment that are substantially identical to the parts of the first exemplary embodiment will be given the same reference numerals as the parts of the first exemplary embodiment except in the 200 series, e.g. "2xx." Moreover, the descriptions of the parts of the third exemplary embodiment that are identical to the parts of the first exemplary embodiment may be omitted for the sake of brevity.

As shown in FIG. 12, a surface 268 of the shoulder 264 extends from the base portion 238 to the distal end 255. The shoulder surface 268 is a substantially continuous and planar surface. The shoulder surface 268 is substantially coplanar with the second side 265 of the base portion 238.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the trim member attachment structure. Accordingly, these terms, as utilized to describe the present invention should be interpreted relative to a vehicle equipped with the trim member attachment structure.

The terms of degree such as "substantially", "about" and "approximately" as used herein mean a reasonable amount of deviation of the modified term such that the end result is not significantly changed.

While only selected exemplary embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present invention are provided for illustration only, and not for the purpose of limiting the invention as defined by the appended claims and their equivalents.

What is claimed is:

1. A trim member attachment structure, comprising:
    a trim member;
    a base portion extending from the trim member; and
    an end portion extending from the base portion, the end portion including
        an engagement surface extending from a first side of the base portion and facing the trim member; and
        a shoulder extending from the base portion on a second side of the base portion, a first end of the shoulder and a first end of the engagement surface facing the trim member being positioned at substantially equal distances along a length of the base portion.

2. The trim member attachment structure according to claim 1, wherein
    the shoulder extends in a direction away from the engagement surface.

3. The trim member attachment structure according to claim 1, wherein
    the second side of the base portion forms an angle with respect to the trim member.

4. The trim member attachment structure according to claim 1, wherein
    the engagement surface forms an angle with the first side of the base portion.

5. The trim member attachment structure according to claim 4, wherein
    the angle is an obtuse angle.

6. The trim member attachment structure according to claim 1, wherein
    the shoulder includes a ramped surface extending from the base portion, and an end surface extending from the ramped surface.

7. The trim member attachment structure according to claim 6, wherein
    the end surface of the shoulder and the second side of the base portion are substantially parallel.

8. The trim member attachment structure according to claim 1, wherein
    a distal end of the end portion is thinner in cross section than the base portion.

9. The trim member attachment structure according to claim 8, wherein
    a guide surface extends between the distal end of the end portion and the engagement surface.

10. The trim member attachment structure according to claim 1, wherein
    a connector portion connects the base portion to the trim member.

11. The trim member attachment structure according to claim 10, wherein
the connector portion is thinner in cross section than the base portion.

12. The trim member attachment structure according to claim 1, wherein
an alignment member extends from the base portion in a direction different from the engagement surface.

13. The trim member attachment structure according to claim 12, wherein
a connector portion connects the base portion and the trim member, and a step is formed between the alignment member and the connector portion.

14. A trim member attachment structure, comprising:
a trim member;
a base portion extending from the trim member;
an end portion extending from the base portion, the end portion including
an engagement surface extending from a first side of the base portion and facing the trim member;
a shoulder extending from the base portion on a second side of the base portion, the shoulder including a ramped surface extending from the base portion and an end surface extending from the ramped surface; and
a guide surface extending between a distal end of the end portion and the engagement surface; and
an alignment member extending directly from the base portion in a direction different from the engagement surface and the shoulder.

15. The trim member attachment structure according to claim 14, wherein
a connector portion connects the base portion to the trim member.

16. The trim member attachment structure according to claim 15, wherein
a step is formed between the alignment member and the connector portion.

17. The trim member attachment structure according to claim 14, wherein
the engagement surface forms an obtuse angle with the first side of the base portion.

18. The trim member attachment structure according to claim 14, wherein
a first end of the alignment member is connected to the base portion and a second end of the alignment member is connected to the end portion.

19. The trim member attachment structure according to claim 14, wherein
the end surface of the shoulder and the second side of the base portion are substantially parallel.

20. The trim member attachment structure according to claim 14, wherein
the ramped surface extends toward the guide surface.

* * * * *